(12) United States Patent
Prior et al.

(10) Patent No.: US 7,754,633 B2
(45) Date of Patent: Jul. 13, 2010

(54) CHROMIA-ALUMINA REFRACTORY

(75) Inventors: H. David Prior, Bethel Park, PA (US); Howard Winkelbauer, Munhall, PA (US); Viktor Fischer, Coraopolis, PA (US)

(73) Assignee: Harbison-Walker Reeractories Company, Moon Township, PA (US)

( * ) Notice: Subject to any disclaimer, the term of this patent is extended or adjusted under 35 U.S.C. 154(b) by 0 days.

(21) Appl. No.: 12/177,249

(22) Filed: Jul. 22, 2008

(65) Prior Publication Data

US 2010/0019419 A1    Jan. 28, 2010

(51) Int. Cl.
*C04B 35/00* (2006.01)
(52) U.S. Cl. .................. 501/132; 501/127
(58) Field of Classification Search .......... 501/127, 501/132
See application file for complete search history.

(56) References Cited

U.S. PATENT DOCUMENTS 3,948,670 A * 4/1976 Manigault ............ 501/107
4,544,643 A * 10/1985 Fraser ............ 501/127
5,306,451 A    4/1994 Wächter ............ 264/65
6,548,435 B1 * 4/2003 Bugajski ............ 501/109

FOREIGN PATENT DOCUMENTS

EP    0119812    9/1984
JP    08-048574    2/1996

* cited by examiner

*Primary Examiner*—David M Brunsman
*Assistant Examiner*—Kevin M Johnson
(74) *Attorney, Agent, or Firm*—Kusner & Jaffe

(57) ABSTRACT

A refractory composition comprising at least 50 weight percent chromic oxide ($Cr_2O_3$), as measured by chemical analysis. The composition includes fused chromia-containing grain, powdered chromic oxide and sintered chromia-containing grain. The fused chromia-containing grain and the sintered chromia-containing grain comprise at least 50 weight percent chromia oxide, as measured by chemical analysis.

14 Claims, No Drawings

CHROMIA-ALUMINA REFRACTORY

FIELD OF THE INVENTION

The present invention relates generally to refractory materials, and more particularly, to chromia-containing refractories.

BACKGROUND OF THE INVENTION

Chromia-containing refractories, such as chromia-alumina bricks, find advantageous use in coal gasifiers, municipal incinerators and applications where resistance to aggressive, fluid slag is important. Some chromia-alumina refractories are comprised of pigment-grade chromic oxide and a fused chromia-alumina grain. The pigment-grade chromic oxide and chromia-alumina grain are typically mixed, pressed into shapes, such as bricks, and then fired. Historically, chromia-alumina refractories with high chromic oxide contents have relatively low strength when measured at both room temperature and at operating temperatures. The strength of a chromia-containing refractory tends to decrease as the chromia content in the refractory increases. In this respect, the reduction in strength is particularly noticeable in chromia-containing refractories having chromic oxide contents in excess of 80% by weight, as measured by chemical analysis. One of the main reasons for the low strength is the lack of bonding between the fused high-chromia grains and the powdered, pigment-grade chromic oxide.

In addition, chromia-alumina refractories are prone to penetration of slags during service. The penetrated area is altered and is subject to thermal spalling. Thus, it would be desirable to increase the strength of chromia-alumina refractories, and to reduce the permeability of these refractories to inhibit slag penetration.

Efforts have been made to improve the strength and to decrease the permeability of these products. Attempts to increase the bond strength between the chromia-alumina fused grain and the pigment-grade chromic oxide by increasing the firing temperature generally do not improve the products because of chrome vaporization that occurs at temperatures beyond the normal firing temperatures. Adjustments to the particle size distributions of the respective components of these compositions, which in theory could reduce permeability, is difficult because pigment-grade chromic oxides are only commercially available in a few sizes. Still further, pressing a chromia-alumina refractory composition to very high densities helps to improve physical properties, but high-chromia refractories are very sensitive to cracking under high forming pressures (a phenomenon known as "pressure cracking").

The present invention provides a chromia-containing refractory having improved strength, lower permeability and increased resistance to slag penetration, as compared to chromia-containing refractories known heretofore.

SUMMARY OF THE INVENTION

In accordance with a preferred embodiment of the present invention, there is provided a refractory composition for forming a chromia-containing brick, comprising about 35% to about 95% by weight of fused chromia-containing grain having a chromic oxide content of at least 50% by chemical analysis, about 1% to about 35% by weight finely powdered chromic oxide and about 5% to about 50% by weight of sintered chromia-containing grain having a chromic oxide content of at least 50% by chemical analysis.

In accordance with another aspect of the present invention, there is provided a chromia-alumina refractory, comprised of about 35% to about 95% by weight of fused chromia-alumina grain, the fused chromia-alumina grain having a chromic-oxide ($Cr_2O_3$) content of at least 50% by chemical analysis, about 1% to about 35% by weight finely powdered chromic oxide ($Cr_2O_3$) and about 5% to about 50% by weight sintered chromia-containing grain, the sintered, chromia-alumina grain having a chromic oxide content of at least 50% by chemical analysis.

In accordance with yet another aspect of the present invention, there is provided a refractory composition comprising at least 50 weight percent chromic oxide ($Cr_2O_3$) by chemical analysis. The composition includes fused chromia-containing grain, powdered chromic oxide and sintered chromia-containing grain. The fused chromia-containing grain and the sintered chromia-containing grain comprise at least 50 weight percent chromic oxide as measured by chemical analysis.

In accordance with yet another aspect of the present invention, there is provided a refractory composition comprised of about 1% to about 35% by weight finely powdered chromic oxide, and a mixture comprised of sintered chromia grain and fused chromia grain. The mixture has up to 50% by weight sintered chromia grain, wherein the sintered chromia grain and the fused chromia grain contain at least 50% chromic oxide ($Cr_2O_3$) by chemical analysis.

In accordance with yet another aspect of the present invention, there is provided a method of manufacturing a refractory brick, comprising the steps of providing a size-graded batch of fused chromia-alumina including a coarse grain fraction comprised of −4+10 Tyler mesh particles, an intermediate grain fraction comprised of −10+28 Tyler mesh particles and a fine grain fraction comprised of −28 Tyler mesh particles; adding a fine grain chromic oxide to the batch such that 10 to 100 percent of the fine grain fraction consists of fine grain chromic oxide; adding sintered chromia-alumina to the batch, such that about 5% to about 50% of the chromia-alumina composition consists of sintered chromia-alumina; mixing a bonding agent to the batch to obtain a formable mix; pressing the mix to form a brick-like shape; and drying and firing the shape to form the brick.

The advantage of the present invention is a chromia-containing refractory having improved, high-temperature strength.

Another advantage of the present invention is a chromia-containing refractory having lower permeability.

Another advantage of the present invention is a chromia-containing refractory having improved resistance to slag penetration.

Another advantage of the present invention is a chromia-alumina refractory.

A still further advantage of the present invention is a chromia-containing refractory as described above that includes sintered chromia-containing grain.

These and other advantages will become apparent from the following description of a preferred embodiment taken together with the appended claims.

DETAILED DESCRIPTION OF PREFERRED EMBODIMENT

The present invention relates generally to a refractory chromia-based composition, and more particularly, to a chromia-based refractory composition having a chromic oxide ($Cr_2O_3$) content of at least 50% by weight as measured by chemical analysis. In a preferred embodiment, the chromia-based refractory composition is comprised of fused chromia-containing grain, sintered chromia-containing grain and pigment-grade chromium oxide. As used herein, the term "fused grain" refers to a product which is obtained by heating a starting material to its molten state, then letting the material solidify. As used herein, the term "sintered grain" refers to a product which is obtained by forming an aggregate by pressing a powder or by other means of agglomeration and heating the aggregate without melting it to form a coherent mass. The terms "chromium oxide," "chromic oxide" and "chromia" mean the oxide of chromium given by the chemical formula $Cr_2O_3$. The terms "finely powdered chromic oxide" and "fine grain chromic oxide" refer to finely particulate chromic oxide with a $Cr_2O_3$ content of at least 85% as measured by chemical analysis, and a particle size that is less than 325 mesh Tyler.

A refractory according to the present invention is comprised of a distribution of particle sizes containing coarse fraction grains and fine fraction grains. The fine fraction grains define the matrix of the refractory and the coarse fraction grains define the very dense, low-porosity part of the refractory.

The coarse fraction of the refractory is comprised of fused chromia-containing grains and may include sintered chromia-containing grains. The fine fraction of the refractory is comprised of finely powdered chromic oxide and fine sintered chromia-containing grains, and may also include fine fused chromia-containing grains.

Stated another way, a refractory according to the present invention is generally comprised of coarse particulates that are formed of fused chromia-containing grains and may include coarse particulates of sintered chromia-containing grains in a matrix of fine particulates comprised of fine grain chromic oxide ($Cr_2O_3$) and fine particulates of sintered chromia-containing grains. The fine particulates may also include fine particulates of fused chromia-containing grains.

It is also contemplated that the refractory may also include fused grains and sintered grains of intermediate sizes to facilitate dense packing of the grains.

In accordance with the present invention, the refractory is comprised of about 35% to about 95% by weight of fused chromia-containing grains having a chromic oxide content of at least 50% by weight, as measured by chemical analysis, about 1% to about 35% by weight fine grain chromic oxide and about 5% to about 50% by weight of sintered chromia-containing grains having a chromic oxide content of at least 50% by weight, as measured by chemical analysis.

A refractory according to the present invention finds advantageous use in forming bricks for use in liquid slag environments. To form a dense brick, the fused, chromia-containing grains forming the coarse fraction of the refractory preferably have varying particle sizes that are 4 Tyler mesh and finer. The sintered, chromia-containing grain also has particles that are 4 Tyler mesh and finer. The fine grain chromic oxide is preferably pigment-grade chromic oxide having a particle size less than 325 Tyler mesh.

As used herein, the term "chromia-containing grain" refers to refractory grain comprised primarily of chromic oxides ($Cr_2O_3$) and alumina ($Al_2O_3$), typically referred to as chromia-alumina grain. At least 50% by weight of refractory grain is comprised of chromic oxide ($Cr_2O_3$), as measured by chemical analysis. More preferably, the chromia containing grains of the present invention have a chromic oxide ($Cr_2O_3$) content of about 75% by weight to about 95% by weight, as measured by chemical analysis.

It is contemplated that the chromia-alumina grain and the refractory compositions described herein may also include other refractory materials, such as, by way of example and not limitation, magnesia (MgO), silica ($SiO_2$), titania ($TiO_2$), iron oxide ($Fe_2O_3$), zirconia ($ZrO_2$), lime (CaO), manganese oxide (MnO), vanadium pentoxide ($V_2O_5$), soda ($Na_2O$), potassium oxide ($K_2O$) and phosphorous pentoxide ($P_2O_5$), but in much lesser amounts.

A method of manufacturing a refractory brick comprises forming a size-graded batch of fused chromia-alumina including a coarse grain fraction comprised of −4+10 Tyler mesh particles, an intermediate grain fraction comprised of −10+28 Tyler mesh particles and a fine grain fraction comprised of −28 Tyler mesh particles. A finely powdered chromic oxide is added to the batch. Preferably, 10 to 100 percent of the fine grain fraction consists of fine grain chromic oxide. Sintered chromia-alumina is added to the batch, such that about 5% to about 50% of the chromia-alumina composition consists of sintered chromia-alumina. A bonding agent is added to the batch and the batch is mixed to obtain a formable mixture. The mixture is pressed into a brick-like shape using conventionally known techniques. The brick-like shape is dried and fired to form the brick.

The invention will be further described in connection with the following EXAMPLES, which are set forth for the purpose of illustration only. All mesh sizes referred to in the EXAMPLES are made with reference to Tyler Screen Standards. By way of example, the legend "−4+10 mesh" means a particle sized less than 4 Tyler mesh, but greater than 10 Tyler mesh, and the legend "−28 mesh" means a particle sized less than 28 Tyler mesh.

A series of four brick batches was made from the mixes shown in TABLE I under the same molding pressures and firing temperatures. These bricks were then tested for bulk density, apparent porosity, apparent specific gravity and modulus of rupture. The results are also set forth in TABLE I.

TABLE I

|  | EXAMPLE NO. | | | |
| --- | --- | --- | --- | --- |
|  | 1 | 2 | 3 | 4 |
| Mix: | | | | |
| CA-95 Fused Grain[1] | | | | |
| −4 + 10 mesh | 23% | 23% | 23% | 18.75% |
| −10 + 28 mesh | 19 | 19 | 14.5 | — |
| −28 mesh | 33 | 14.25 | — | — |
| CA-95 Sintered Grain[2] | | | | |
| −4 + 10 mesh | — | — | — | 4.25 |
| −10 + 28 mesh | — | — | 2.5 | 17 |
| −28 mesh | — | 18.75 | 35 | 35 |
| Pigment Grade Chromic Oxide | 25 | 25 | 25 | 25 |
| Plus Additions: | | | | |
| Lignosulfonate | 2.1 | 2.1 | 2.1 | 2.1 |
| Water | 1.2 | 1.5 | 1.8 | 2.3 |
| Pressing Pressure, psi: | 15,000 | 15,000 | 15,000 | 15,000 |
| Burning temperature, °F.: | 2630 | 2630 | 2630 | 2630 |
| Bulk Density, pcf: | 265 | 259 | 252 | 243 |
| Apparent Porosity, %: | 17.4 | 19.1 | 21.0 | 23.6 |
| Apparent Specific Gravity: | 5.15 | 5.13 | 5.12 | 5.10 |
| Modulus of Rupture at Room Temperature, psi: | 1380 | 3030 | 3160 | 3660 |
| Calculated Chemistry (Calcined Basis) | | | | |
| $SiO_2$ | 0.32% | 0.53% | 0.75% | 0.97% |
| $Al_2O_3$ | 3.46 | 2.67 | 1.88 | 1.09 |
| $TiO_2$ | 0.02 | 0.34 | 0.65 | 0.96 |
| $Fe_2O_3$ | 0.16 | 0.15 | 0.14 | 0.14 |

TABLE I-continued

| | EXAMPLE NO. | | | |
|---|---|---|---|---|
| | 1 | 2 | 3 | 4 |
| $Cr_2O_3$ | 95.77 | 95.94 | 96.12 | 96.29 |
| CaO | 0.13 | 0.16 | 0.18 | 0.21 |
| MgO | <0.01 | 0.03 | 0.07 | 0.1 |
| MnO | 0.06 | 0.05 | 0.03 | 0.02 |
| $Na_2O$ | 0.01 | 0.05 | 0.09 | 0.14 |
| $K_2O$ | 0.02 | 0.04 | 0.06 | 0.07 |
| $P_2O_5$ | 0.05 | 0.04 | 0.03 | 0.02 |
| Total | 100.0% | 100.0% | 100.0% | 100.01% |

[1] CA-95 Fused Grain refers to a fused chromia-alumina grain containing approximately 95% $Cr_2O_3$.
[2] CA-95 Sintered Grain refers to a sintered chromia-alumina grain containing approximately 95% $Cr_2O_3$.

TABLE I shows the effect of incrementally replacing fused grain containing approximately 95% $Cr_2O_3$ and 5% $Al_2O_3$ with a sintered grain of similar composition. There was a gradual increase in modulus of rupture at room temperature and porosity as fused chromia-alumina grain was replaced by sintered chromia-alumina grain.

Two brick batches were made from the mixes shown in TABLE II under the same molding pressures and firing temperatures. These bricks were then tested for bulk density, porosity, specific gravity, modulus of rupture at room temperature, permeability and for slag penetration. The results are also set forth in TABLE II.

TABLE II

| | EXAMPLE NO. | |
|---|---|---|
| | 5 | 6 |
| Mix: | | |
| CA-95 Fused Grain | | |
| −4 + 10 mesh | 29% | 29% |
| −10 + 28 mesh | 21 | 11 |
| −28 mesh | 26 | 15 |
| CA-95 Sintered Grain | | |
| −14 mesh | — | 20 |
| Pigment Grade Chromic Oxide | 20 | 21 |
| Tabular Alumina, −325 mesh | 4 | 4 |
| Plus Additions: | | |
| Lignosulfonate | | 2.3 |
| Dextrin | 1.1 | |
| Water | 0.92 | 1.1 |
| Firing Temperature, °F.: | 2630 | 2630 |
| Bulk Density, pcf: | 263 | 258 |
| Apparent Porosity, %: | 16.4 | 16.5 |
| Apparent Specific Gravity: | 5.05 | 5.01 |
| Modulus of Rupture at Room Temperature, psi: | 1690 | 3240 |
| Permeability, centidarcies: | 42.3 | 11.0 |
| Gasifier Slag Test at 3000° F. using an Induction Furnace, 5-Hour hold | | |
| % Area Penetrated: | 15.2 | 10.1 |
| Calculated Chemistry (Calcined Basis) | | |
| $SiO_2$ | 0.32% | 0.55% |
| $Al_2O_3$ | 7.49 | 6.6 |
| $TiO_2$ | 0.02 | 0.36 |
| $Fe_2O_3$ | 0.16 | 0.15 |
| $Cr_2O_3$ | 91.81 | 91.98 |
| CaO | 0.04 | 0.15 |
| MgO | <0.1 | 0.04 |
| MnO | 0.06 | 0.05 |
| $Na_2O$ | 0.02 | 0.07 |
| $K_2O$ | 0.02 | 0.04 |
| $P_2O_5$ | 0.05 | 0.04 |
| Total | 99.99% | 100.03% |

TABLE II shows the effect of replacing 20% fused grain composed of approximately 95% $Cr_2O_3$ and 5% $Al_2O_3$ with a sintered grain of similar composition. Adding the sintered grain caused the modulus of rupture at room temperature to increase from 1690 to 3240 psi. At the same time, the permeability, measured in centidarcies, decreased from 42.3 to 11.0. In addition, in a Coal Gasifier Slag Test at 3000° F., the area penetrated decreased from 15.2 to 10.1% with the addition of the sintered grain. Reducing the amount of penetration is important because in service the penetrated zone is subject to thermal shock or "spalling," reducing the useful service life of the refractory.

While not fully understood, it is suspected that the presence of sintered chromia-alumina grain in compositions based on fused chromia-alumina grain and pigment grade chromic oxide creates better bonding. The sintered chromia-alumina grain has a much higher surface area and apparent porosity than fused grain. For example, the calculated porosity of a sintered chromia-alumina grain containing 95% $Cr_2O_3$ is about 15 to 21%, whereas the calculated porosity of a fused chromia-alumina grain containing 95% $Cr_2O_3$ is about 4 to 6%. The higher porosity and the rougher surface of the sintered grains may provide a means for the fine grain chromic oxide particles that form the matrix of the refractory to bond better to such grains. This unexpectedly improves sintering, which also results in lower permeability.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A refractory composition for forming a chrome brick, comprising:
   about 35% to about 95% by weight of fused chromia-containing grain having a chromic oxide content of at least 50%, as measured by chemical analysis;
   about 1% to about 35% by weight fine grain chromic oxide; and
   about 5% to about 50% by weight of sintered chromia-containing grain having a chromic oxide content of at least 50%, as measured by chemical analysis.

2. A refractory composition as defined in claim 1, wherein said fused chromia-containing grain and said sintered chromia-containing grain are comprised primarily of chromia-alumina grain.

3. A refractory composition as defined in claim 1, wherein said refractory composition is comprised of at least 50 weight percent chromic oxide as measured by chemical analysis.

4. A refractory composition as defined in claim 1, wherein said fused chromia-containing grain has a range of particle sizes of 4 Tyler mesh and finer.

5. A refractory composition as defined in claim 1, wherein said sintered, chromia-containing grain has a range of particle sizes wherein at least 80% of sintered grain has a particle size less than 10 Tyler mesh.

6. A chromia-alumina refractory, comprised of:
   about 35% to about 95% by weight of fused chromia-alumina grain, said fused chromia-alumina grain having a chromic-oxide ($Cr_2O_3$) content of at least 50%, as measured by chemical analysis;
   about 1% to about 35% by weight fine grain chromic oxide ($Cr_2O_3$); and
   about 5% to about 50% by weight sintered chromia-containing grain, said sintered chromia-alumina grain having a chromic oxide content of at least 50%, as measured by chemical analysis.

7. A chromia-alumina refractory as defined in claim 6, wherein said chromia-alumina refractory has a chromic oxide content of at least 75 weight percent, as measured by chemical analysis.

8. A chromia-alumina refractory as defined in claim 6, wherein said chromia-alumina refractory has a chromic oxide content of at least 90 weight percent, as measured by chemical analysis.

9. A chromia-alumina refractory as defined in claims 7 or 8, wherein said fused chromia-alumina grain comprises particles having sizes of 4 Tyler mesh and finer and said sintered chromia-alumina grain comprises particles of 4 Tyler mesh and finer.

10. A refractory composition comprising at least 50 weight percent chromic oxide ($Cr_2O_3$), as measured by chemical analysis, said composition including fused chromia-containing grain, finely powdered chromic oxide and sintered chromia-containing grain, said fused chromia-containing grain and said sintered chromia-containing grain comprising at least 50 weight percent chromium oxide, as measured by chemical analysis, wherein said fused chromia-containing grain and said sintered chromia-containing grain are comprised primarily of chromia-alumina, and wherein said fused chromia-alumina grain comprises about 35% to about 95% by weight of said refractory, and said sintered chromia-alumina grain comprises about 5% to about 50% by weight of said refractory.

11. A refractory composition as defined in claim 10, wherein said refractory composition comprises at least 75 weight percent chromic oxide ($Cr_2O_3$), as measured by chemical analysis.

12. A refractory composition as defined in claim 10, wherein said refractory composition comprises at least 90 weight percent chromic oxide ($Cr_2O_3$), as measured by chemical analysis.

13. A refractory composition as defined in claim 10, wherein said fine grain chromic-oxide comprises about 1% to about 35% by weight of said refractory.

14. A refractory composition as defined in claim 13, wherein said sintered chromia-alumina grain is comprised of particles having sizes less than 4 Tyler mesh, wherein 80 percent of said particles have sizes less than 10 Tyler mesh.

* * * * *